United States Patent
Muroyama et al.

(10) Patent No.: US 11,449,251 B2
(45) Date of Patent: Sep. 20, 2022

(54) STORAGE CONTROL DEVICE AND NON-TRANSITORY COMPUTER-READABLE STORAGE MEDIUM FOR STORING CONTROL PROGRAM

(71) Applicant: FUJITSU LIMITED, Kawasaki (JP)

(72) Inventors: Tomohiko Muroyama, Kawasaki (JP); Shinichi Nishizono, Kawasaki (JP); Shoji Oshima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/078,142

(22) Filed: Oct. 23, 2020

(65) Prior Publication Data

US 2021/0191637 A1    Jun. 24, 2021

(30) Foreign Application Priority Data

Dec. 18, 2019   (JP) .............................. JP2019-228552

(51) Int. Cl.
    *G06F 3/06*   (2006.01)

(52) U.S. Cl.
    CPC .......... *G06F 3/0634* (2013.01); *G06F 3/0605* (2013.01); *G06F 3/0658* (2013.01); *G06F 3/0683* (2013.01)

(58) Field of Classification Search
    CPC .... G06F 3/0634; G06F 3/0605; G06F 3/0683; G06F 3/0658
    See application file for complete search history.

(56) References Cited

U.S. PATENT DOCUMENTS

| | | | | |
|---|---|---|---|---|
| 6,813,697 | B1* | 11/2004 | Tomonaga | G06F 12/0623 711/153 |
| 8,656,098 | B1* | 2/2014 | Stern | G06F 3/0689 711/111 |
| 10,769,044 | B2* | 9/2020 | Lim | G06F 11/3044 |
| 2002/0007469 | A1* | 1/2002 | Taketa | G06F 11/1076 714/5.11 |

(Continued)

FOREIGN PATENT DOCUMENTS

| | | |
|---|---|---|
| JP | H11-143649 A | 5/1999 |
| JP | 2012-048613 A | 3/2012 |

OTHER PUBLICATIONS

Heller, RA, "Direct Access Storage Control Disconnect", An IP.com Prior Art Database Technical Disclosure, Nov. 1, 1971.*

(Continued)

*Primary Examiner* — Pierre Michel Bataille
(74) *Attorney, Agent, or Firm* — Fujitsu Patent Center (57) ABSTRACT

A storage control device operable to be one of a plurality of storage control devices included in a storage device, the storage control device includes: a memory; and a processor coupled to the memory, the processor being configured to processing, the processing including: executing a determination processing that includes determining whether activation of the storage control device is caused by activation of the entire storage device or activation of the storage control device alone; and executing a region setting processing that includes setting a control information storage region that stores control information used to enable a function of the storage device according to a determination result by the determination processing.

7 Claims, 12 Drawing Sheets

(56) References Cited

U.S. PATENT DOCUMENTS

| | | | |
|---|---|---|---|
| 2012/0054441 A1* | 3/2012 | Nakashima | G06F 11/1441 |
| | | | 711/124 |
| 2015/0331621 A1* | 11/2015 | Slik | G06F 3/0683 |
| | | | 711/114 |
| 2016/0320977 A1* | 11/2016 | Shinozaki | G06F 11/1402 |
| 2018/0096711 A1* | 4/2018 | Seo | G11C 7/10 |
| 2020/0310976 A1* | 10/2020 | Ji | G06F 12/0238 |

OTHER PUBLICATIONS

Luiz, FA, Martin, RW, "Multistorage Control Interface Switch", An IP.com Prior Art Database Technical Disclosure, Feb. 27, 2005.*

* cited by examiner

|  | Byte#0 | Byte#1 | Byte#2 | Byte#3 |
|---|---|---|---|---|
| 0x00 : 0x0C | Cache Table Information[0] | | | |
| 0x10 : : | Cache Table Information[1] | | | |
| 0xYY : | Cache Table Information[n-1] | | | |

FIG. 7

|      | Byte#0 | Byte#1 | Byte#2 | Byte#3 |
|------|--------|--------|--------|--------|
| 0x00 | Memory Pool Name ||||
| 0x04 | Pool ID ||||
| 0x08 | Allocate Size ||||
| 0x0C | Attribute ||||

STORAGE CONTROL DEVICE AND NON-TRANSITORY COMPUTER-READABLE STORAGE MEDIUM FOR STORING CONTROL PROGRAM

CROSS-REFERENCE TO RELATED APPLICATION

This application is based upon and claims the benefit of priority of the prior Japanese Patent Application No. 2019-228552, filed on Dec. 18, 2019, the entire contents of which are incorporated herein by reference.

FIELD

The embodiment discussed herein is related to a storage control device and a non-transitory computer-readable storage medium storing a control program.

BACKGROUND

Various functions are mounted on a storage device, and a user performs an operation for enabling a needed function when the user uses the function.

Figure 1:
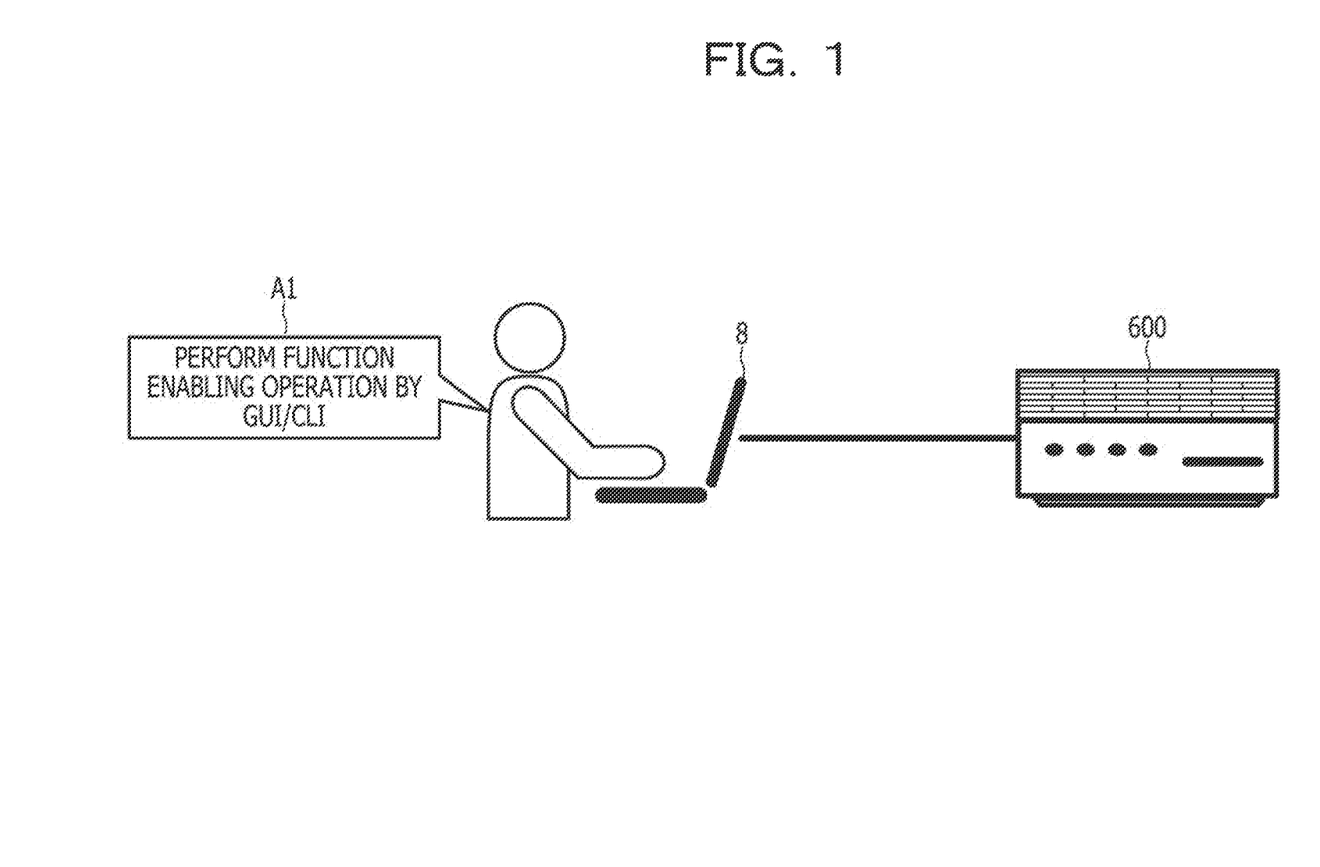
FIG. 1 is a diagram for explaining an example of an operation of a storage device.

FIG. 1 is a diagram for explaining an example of an operation of a storage device 600.

The storage device 600 accepts an operation for enabling a function by a Graphical User Interface (GUI) or a Command Line Interface (CLI) of a user terminal 8, as indicated by reference numeral A1. As a result, the storage device 600 dynamically acquires a memory region needed for controlling the target function and executes device configuration change processing or the like so as to make the function be available.

Examples of the related art include Japanese Laid-open Patent Publication No. 2012-048613 and Japanese Laid-open Patent Publication No. 11-143649.

SUMMARY

According to an aspect of the embodiments, described is a storage control device operable to be one of a plurality of storage control devices included in a storage device. the storage control device includes: a memory; and a processor coupled to the memory, the processor being configured to processing, the processing including: executing a determination processing that includes determining whether activation of the storage control device is caused by activation of the entire storage device or activation of the storage control device alone; and executing a region setting processing that includes setting a control information storage region that stores control information used to enable a function of the storage device according to a determination result by the determination processing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 2:
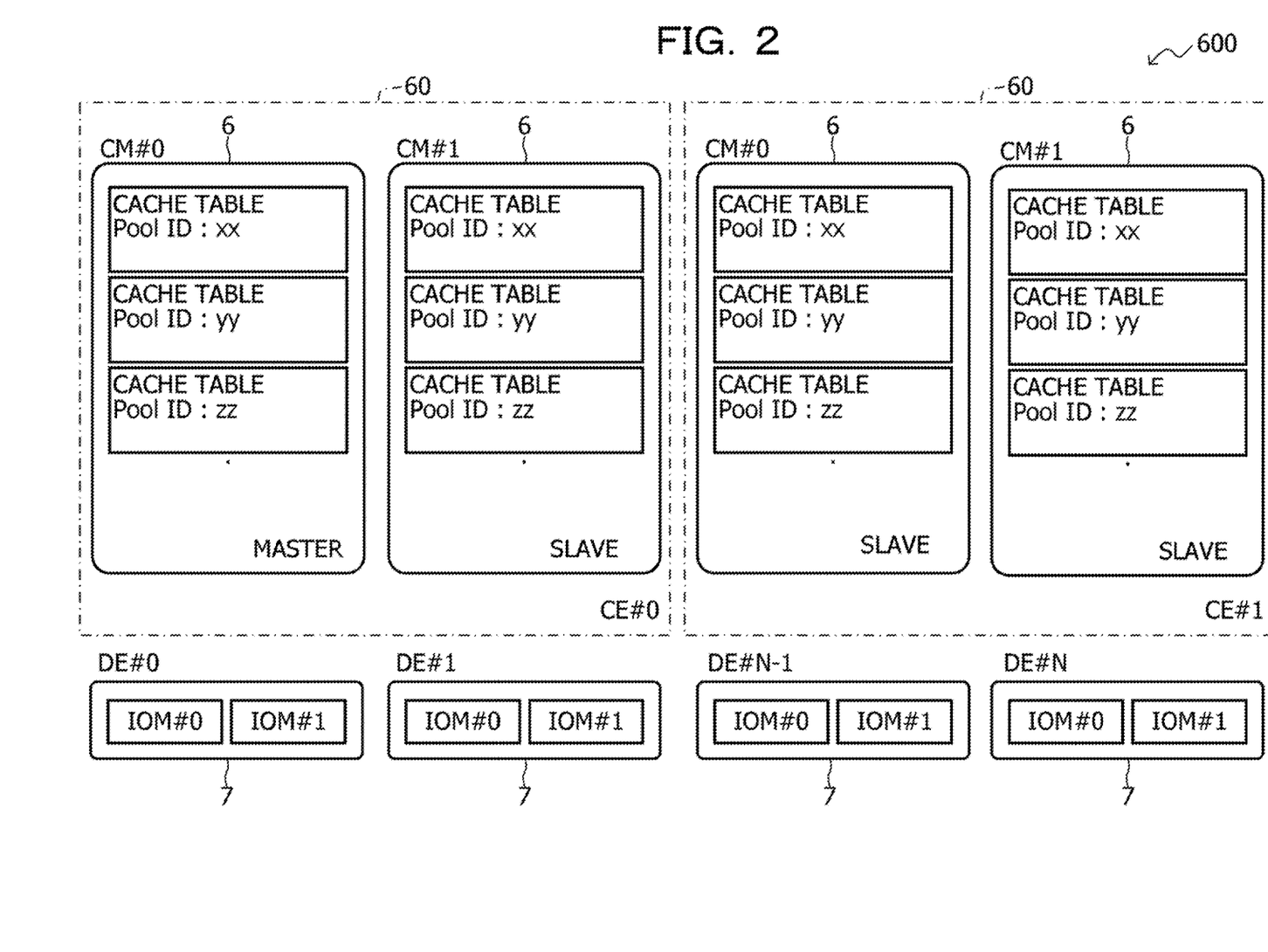
FIG. 2 is a block diagram illustrating a state where a cache table acquisition state is normal.

FIG. 2 is a block diagram illustrating a state where a cache table acquisition state is normal.

The storage device 600 includes a plurality of Controller Enclosures (CE) 60 (in other words, CEs #0 and #1) and a plurality of Drive Enclosures (DE) 7 (in other words, DEs #0, #1, . . . , #n−1, and #n).

Each DE 7 includes Input Output Modules (IOM) #0 and #1.

Each CE 60 includes two Controller Modules (CM) 6 (in other words, CMs #0 and #1), Note that the CM #1 of the CE #0 may be a master CM, and other CMs 6 may be slave CMs.

In a case where the function mounted on the storage device 600 is used, there is a case where control data used to control the target function is held on a cache as a management table. For example, in each CM 6 in FIG. 2, a memory region (table region) for storing a cache table for each Pool ID (xx, yy, zz, . . . ) is ensured on a cache memory (hereinafter, abbreviated as cache). Furthermore, in a case where the table region is ensured on the cache, after the table region is dynamically ensured from the cache while devices in all the CMs 6 are operating in function enabling processing, information indicating that the function is valid as a device configuration is reflected in each CM 6.

When the device is activated, device configuration information is referred, a table size needed for each function is calculated on the basis of a setting value, and processing for ensuring the table regions in all the CMs 6 is executed.

Because the cache table acquisition processing is executed in synchronization in all the CMs 6, in a case where an abnormality occurs in the CM 6 during the function enabling processing, there is a case where the acquisition of the table region on the cache fails. Because the function enabling processing is interrupted and abnormally terminated, the function to be enabled as a functional configuration is invalid. The CM 6 having an abnormality due to software panic rather than a hardware abnormality automatically reboots and executes incorporation processing into a device, and recovery processing (in other words, Check 1) is executed. The CM 6 that has executed Check 1 activates in a state of referring to the device configuration as in Power on processing and acquiring a table region needed for each function. Since the target function that has been enabled as the device configuration is invalid, the table region is not ensured in the rebooted CM 6. However, because the function enabling processing is proceeded to the middle in the other normal CM 6, a state exists where cache table acquisition states of the respective CMs 6 do not match.

Figure 3:
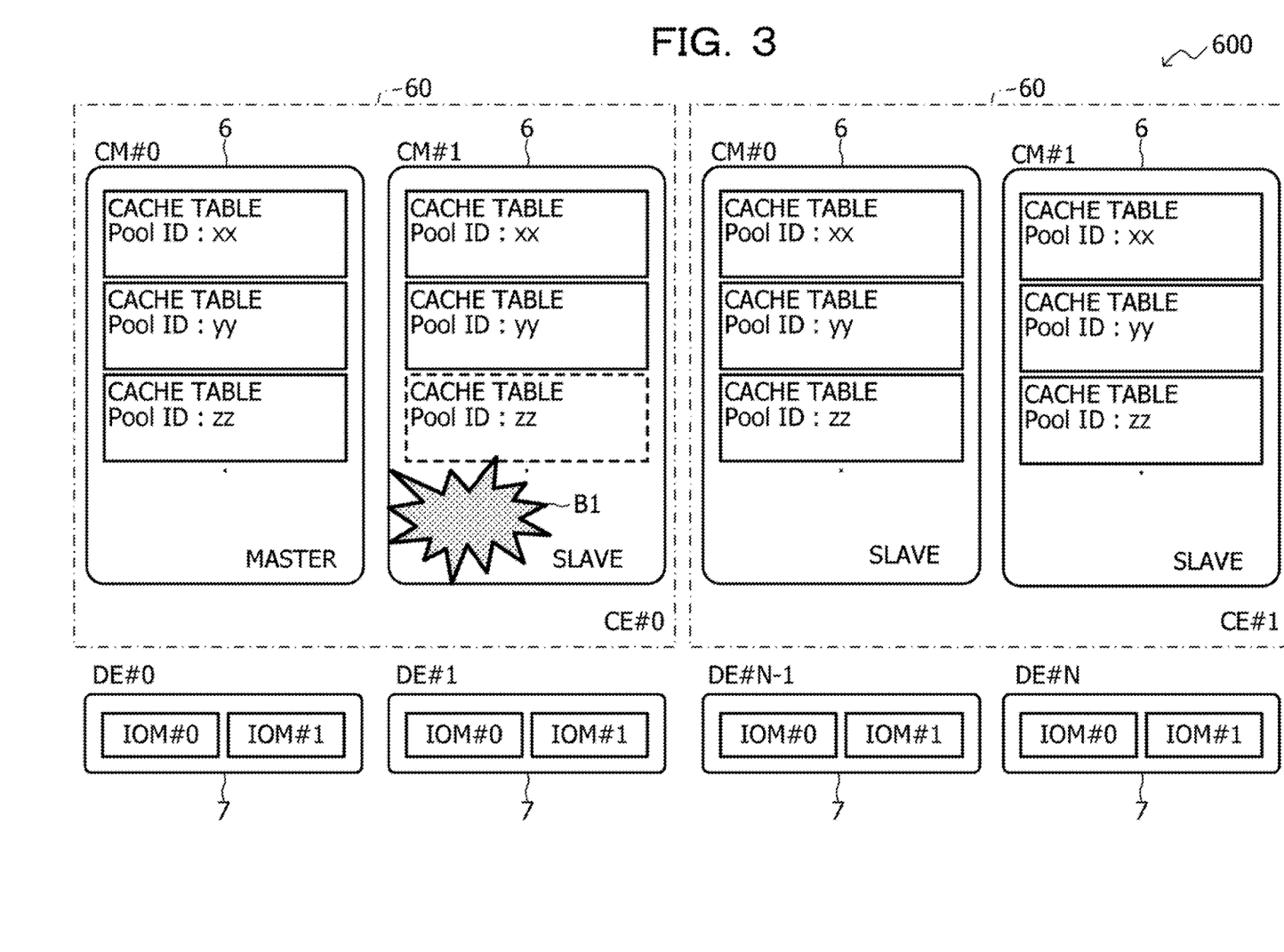
FIG. 3 is a block diagram illustrating a state where the cache table acquisition states do not match.

FIG. 3 is a block diagram illustrating a state where the cache table acquisition states do not match.

In the example illustrated in FIG. 3, as indicated by reference numeral B1, a reboot caused by software panic occurs in the CM #1 of the CE #0 while the table region having the Pool ID: zz is acquired, and the acquisition state of the table region of the CM #1 of the CM #0 does not match the acquisition state of the other CM 6.

The cache memory mounted on the CM 6 is used as a cache region where Input/Output (I/O) from a host is processed at high speed, in addition to the control table used to control the storage device 600. Because an unused region in a state where the function is invalid is used as a cache region for host I/O processing independently for each CM 6, there is a case where the acquisition states of the cache tables are different between the CMs 6. Then, in a case where the cache region used for the host I/O is overlapped with the table region used for various functions, there is a possibility that an event such that data is destroyed occurs.

According to an aspect of the embodiments, provided is a solution to match cache table acquisition states of a plurality of storage control devices included in a storage device.

Hereinafter, an embodiment will be described with reference to the drawings. However, the embodiment described below is merely an example and does not intend to exclude application of various modifications and techniques that are not explicitly described in the embodiment. For example, the present embodiment can be variously modified and implemented without departing from the scope of the spirit thereof.

Furthermore, each drawing does not intend to include only components illustrated in the drawing and can include other functions or the like.

Hereinafter, in the drawings, since each of the same reference numerals indicates a similar component, the description thereof is omitted.

[A] Example of Embodiment

[A-1] Exemplary System Configuration

Figure 4:
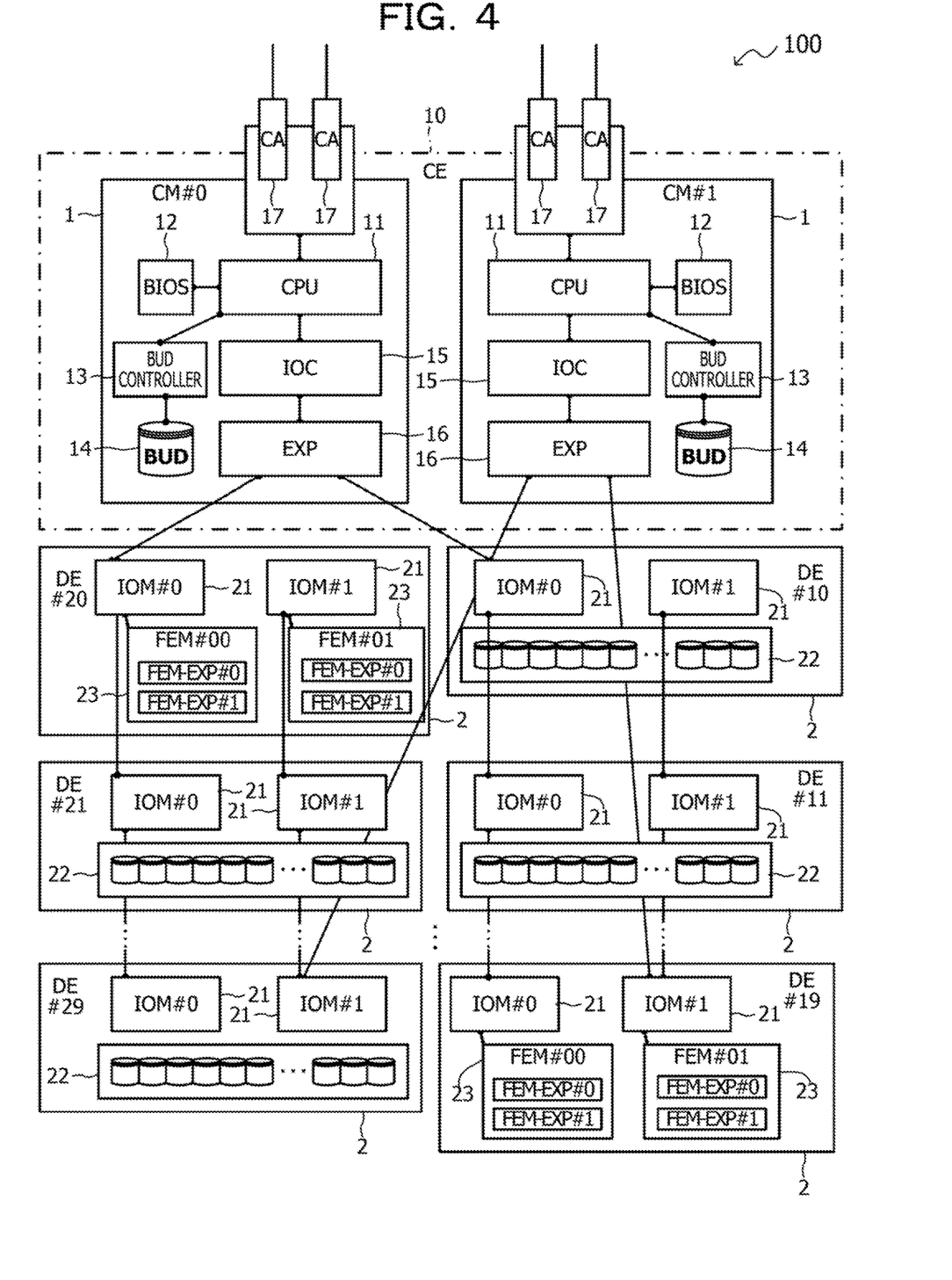
FIG. 4 is a block diagram schematically illustrating an exemplary hardware configuration of a storage device in an example according to an embodiment.

FIG. 4 is a block diagram schematically illustrating an exemplary hardware configuration of a storage device 100 in an example according to an embodiment.

The storage device 100 includes a CE 10 and a plurality of DEs 2 (in other words, DEs #10 to #29).

As illustrated in FIG. 4, each of a part of the DEs 2 (in other words, DEs #19 and #20) includes a plurality of IOMs 21 (in other words, IOMs #0 and #1) and a plurality of Fan Expander Modules (FEM) 23 (in other words, FEMs #00 and #01). Furthermore, each of the other DEs 2 includes the plurality of IOMs 21 (in other words, IOMs #0 and #1) and a disk group 22.

The IOM 21 is an I/O unit or a board and transfers a Serial Attached SCSI (SAS) frame from a CM 1 of the CE 10 described later to a designated drive.

The disk group 22 includes disks such as a plurality of Hard Disk Drives (HDD).

The FEM 23 transfers the SAS frame received by the IOM 21 from the CM 1 to the designated drive. The FEM 23 includes a fan and cools the inside of the DE 2.

The CE 10 includes the plurality of CMs 1 (in other words, CMs #0 and #1).

The CM 1 is an example of a storage control device and includes a CPU 11, a BIOS 12, a BUD controller 13, a BUD 14, an IOC 15, an EXP 16, and a CA 17. Note that the CPU is an abbreviation of a Central Processing Unit, the BIOS is an abbreviation of a Basic Input/Output System, and the BUD is an abbreviation of a Boot up Utility Device. Furthermore, the IOC is an abbreviation of an Input Output Controller, the EXP is an abbreviation of an Expander, and the CA is an abbreviation of a Communication Adapter.

The BIOS 12 is executed by the CPU 11 and inputs/outputs data to/from hardware from a program.

The BUD controller 13 relays an access from the CPU 11 to the BUD 14.

The BUD 14 is firmware that activates the storage device 100 and records a log at the time of activation.

The IOC 15 performs data transfer between the DE 2 and the CPU 11 and is configured, for example, as a dedicated chip.

The EXP 16 is an expander chip for SAS/Serial ATA (SATA) connection and is a switch mechanism that connects the CM 1 and the plurality of DEs 2. The plurality of DEs 2 is cascade-connected to the CM 1. The DEs #20 to #29 are cascade-connected to the CM #0, and the DEs #10 to #19 are cascade-connected to the CM #1 respectively.

The CA 17 is an interface that communicatively connects a host device (not illustrated) and the storage device 100.

Figure 5:
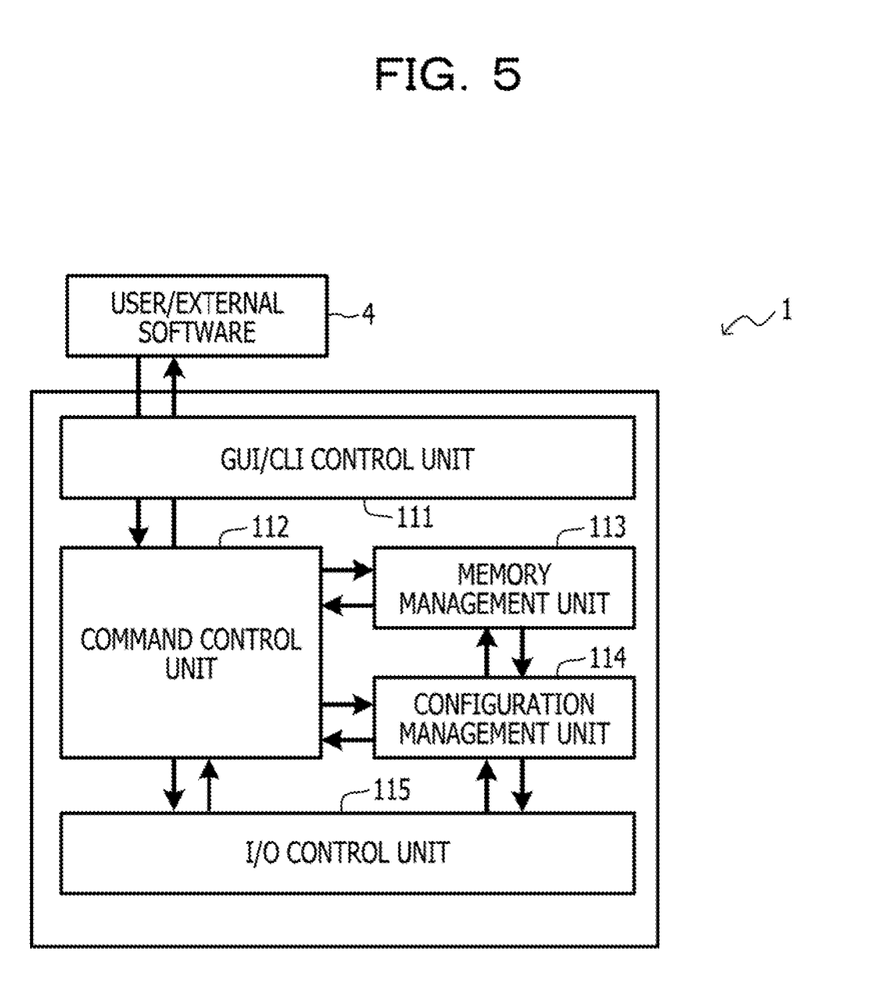
FIG. 5 is a block diagram schematically illustrating an exemplary software configuration of a CM illustrated in FIG. 4.

FIG. 5 is a block diagram schematically illustrating an exemplary software configuration of the CM 1 illustrated in FIG. 4.

The CPU 11 is, for example, a processing device that performs various controls and calculations and realizes various functions. For example, as illustrated in FIG. 5, the CPU 11 may function as a GUI/CLI control unit 111, a command control unit 112, a memory management unit 113, a configuration management unit 114, and an I/O control unit 115.

Note that a program that realizes the functions as the GUI/CLI control unit 111, the command control unit 112, the memory management unit 113, the configuration management unit 114, and the I/O control unit 115 may be provided in a form recorded in a computer-readable recording medium, for example, a flexible disk, a CD (CD-ROM, CD-R, CD-RW, or the like), a DVD (DVD-ROM, DVD-RAM, DVD-R, DVD+R, DVD-RW, DVD+RW, HD DVD, or the like), the Blu-ray disc, a magnetic disc, an optical disc, a magneto-optical disc, or the like. Then, a computer (CPU 11 in the present embodiment) may read the program from the recording medium described above via a reading device (not illustrated), transfer and store the read program to an internal recording device or an external recording device, and use the program. Furthermore, the program may be recorded, for example, in a memory device (recording medium) such as a magnetic disc, an optical disc, a magneto-optical disc, or the like and be provided to the computer from the memory device via a communication path.

When the function as the GUI/CLI control unit 111, the command control unit 112, the memory management unit 113, the configuration management unit 114, and the I/O control unit 115 is realized, the computer (CPU 11 in the present embodiment) may execute a control program stored in the internal memory device. Furthermore, the computer may read and execute a control program recorded in the recording medium.

The CPU 11 controls, for example, a behavior of the entire CM 1. A device for controlling the behavior of the entire CM 1 is not limited to the CPU 11 and may be, for example, any one of an MPU, a DSP, an ASIC, a PLD, and an FPGA. Furthermore, the device for controlling the behavior of the entire CM 1 may be a combination of two or more of the CPU, the MPU, the DSP, the ASIC, the PLD, and the FPGA. Note that the MPU is an abbreviation of a Micro Processing Unit, the DSP is an abbreviation of a Digital Signal Processor, and the ASIC is an abbreviation of an Application Specific Integrated Circuit. Furthermore, the PLD is an abbreviation of a Programmable Logic Device, and the FPGA is an abbreviation of a Field Programmable Gate Array.

The GUI/CLI control unit 111 receives an instruction from a user/external software 4 and executes a command Interface (IF) for device control. When the CLI is executed, the command IF for control may be set and requested to the command control unit 112. Note that the user/external software 4 may be storage management software that behaves on the host device (not illustrated). The user/external software 4 may manage the functions of the storage device 100 from the storage management software and execute processing for enabling a needed function of the storage device 100.

The command control unit 112 controls an internal processing sequence on the basis of the setting of the command IF for control executed by the GUI/CLI control unit 111.

The memory management unit 113 executes processing for acquiring and releasing a cache table (in other words, control information) in the storage device 100.

The memory management unit 113 checks a reboot mode of the CM 1 when the CM 1 is activated and executes processing for optimally acquiring a table region of the cache table. In a case where function enabling processing is abnormally terminated while the processing for acquiring the cache table is executed at the time when the function of the storage device 100 is enabled, the memory management unit 113 determines whether the activation of the CM 1 is Power on processing on the entire storage device 100 or the reboot of the CM 1 alone. Then, by executing the cache table acquisition processing according to whether the activation of the CM 1 is the Power on processing of the entire storage device 100 or the reboot of the CM 1 alone, the memory management unit 113 avoids that the acquisition states of the cache tables do not match between the CMs 1.

In a case where the activation of the CM 1 is the Power on processing of the entire storage device 100, the same device configuration information is held in all the CMs 1. Therefore, consistency of the acquisition states of the cache tables in all the CMs 1 is ensured. Therefore, the memory management unit 113 calculates a size of the cache table from the device configuration information and acquires the table region from a cache memory.

On the other hand, in a case where the CM 1 reboots alone, the memory management unit 113 acquires cache table acquisition state information (described later with reference to FIG. 6) from the master CM 1. Then, the memory management unit 113 executes the cache table acquisition processing on the basis of the device configuration information of the CM 1 and the cache table acquisition state information of the master CM 1.

For example, the memory management unit 113 functions as an example of a determination unit that determines whether the activation of the CM 1 is caused by the activation of the entire storage device 100 or the activation of the CM 1 alone. Then, the memory management unit 113 functions as an example of a region setting unit that sets a table region (in other words, control information storage region) that stores a cache table for enabling the functions of the storage device 100 according to the determination result.

Furthermore, in a case where the activation of the CM 1 that functions as a slave is caused by the activation of the CM 1 alone, the memory management unit 113 may acquire an acquisition state of the control information storage region from the CM 1 that functions as a master and acquire the table region on the basis of the acquired acquisition state.

Moreover, the memory management unit 113 may acquire a table region for a Pool of which an ID is included in the acquisition state according to a size of the region allocated in the acquisition state.

Furthermore, the memory management unit 113 may acquire a table region for a Pool of which the ID is not included in the acquisition state as setting a size of the region to be zero.

Moreover, in a case where it is not possible to acquire the acquisition state, the memory management unit 113 may acquire the table region after reactivating the entire storage device 100.

The configuration management unit 114 executes configuration change processing and issues a processing change notification when a command is executed.

The I/O control unit 115 executes I/O processing from the host and redundancy processing on user data.

Figure 6:
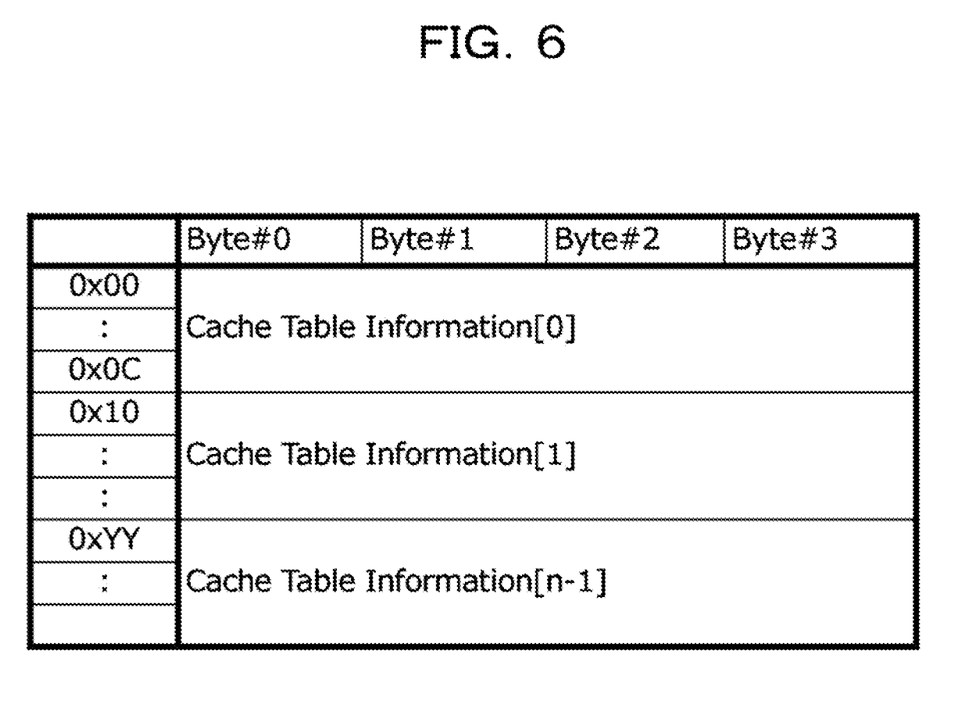
FIG. 6 is a table illustrating cache table acquisition state information of the CM illustrated in FIG. 4.

FIG. 6 is a table illustrating the cache table acquisition state information of the CM 1 illustrated in FIG. 4.

In the cache table acquisition state information, Cache Table information [0] is stored in Bytes 0x00 to 0x10. Furthermore, Cache Table information [1], . . . , and [n−1] is stored in the Byte 0x10 and subsequent bytes.

Figure 7:
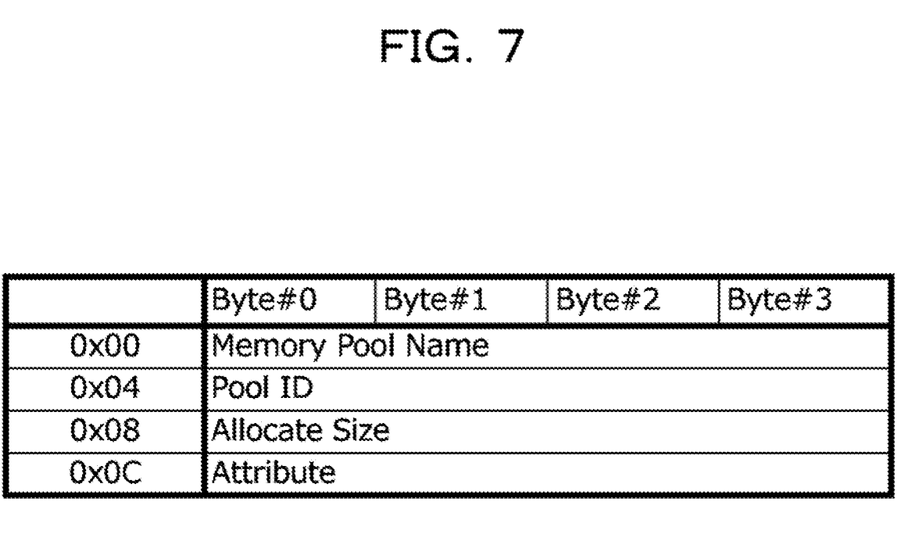
FIG. 7 is a table illustrating cache table information illustrated in FIG. 4.

FIG. 7 is a table illustrating the cache table information illustrated in FIG. 4.

In the Cache Table Information [0] illustrated in FIG. 6, Memory Pool Name is stored in Bytes 0x00 to 0x03, Pool ID is stored in Bytes 0x04 to 0x07, Allocation Size is stored in Bytes 0x08 to 0x0B, and Attribute is stored in Byte 0x0C and subsequent bytes. Similarly, in the Cache Table information [1], . . . , and [n−1], each field is stored.

Memory Pool Name is a name of the cache table, Pool ID is an identifier of the cache table, Allocation Size is an acquisition size of the cache table, and Attribute is an attribute of the cache table.

[A-2] Example of Behavior

Figure 8:
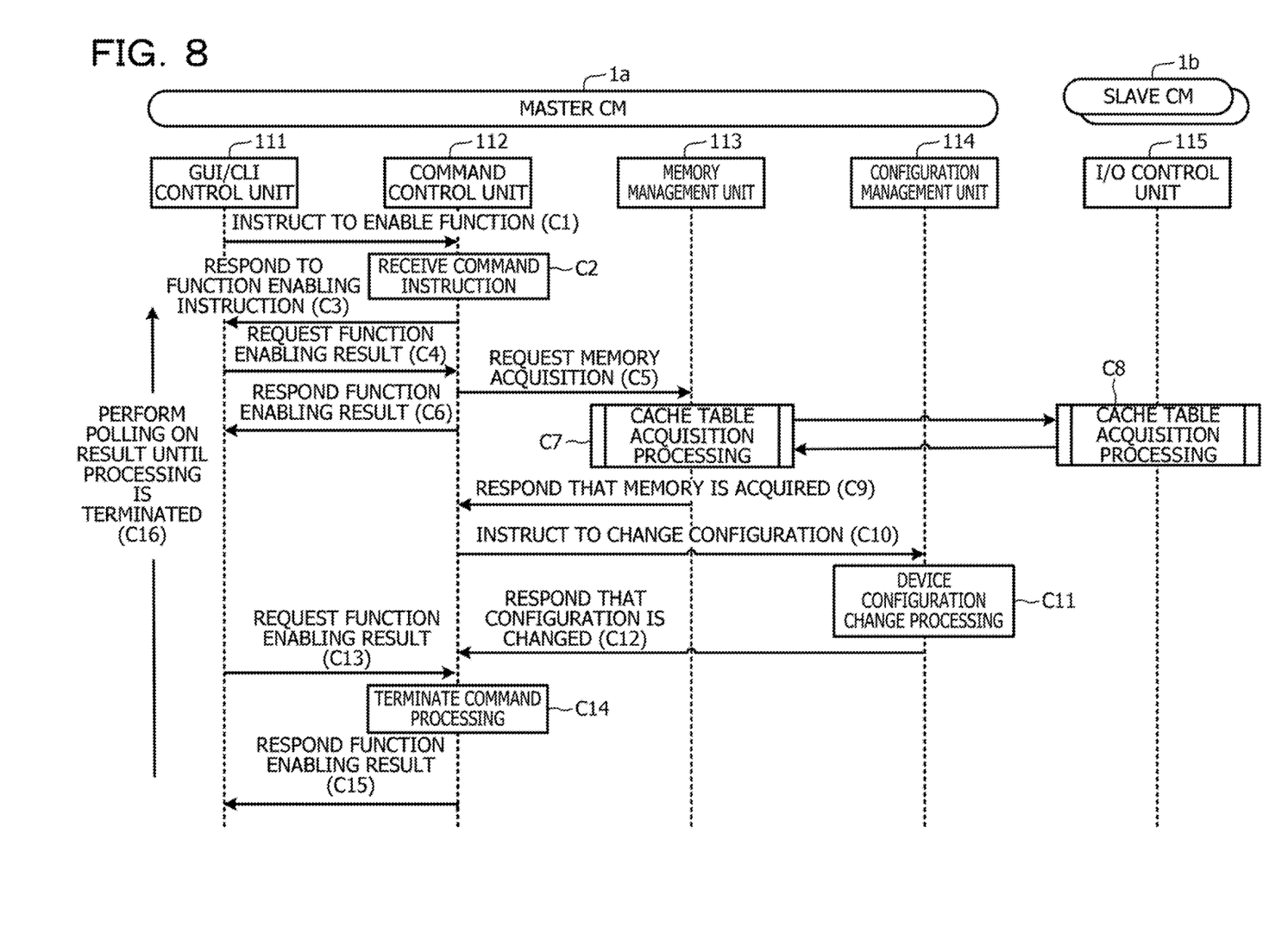
FIG. 8 is a sequence diagram for explaining function enabling processing of the storage device illustrated in FIG. 4.

The function enabling processing of the storage device 100 illustrated in FIG. 4 will be described with reference to the sequence diagram (processing C1 to C16) illustrated in FIG. 8.

Hereinafter, a CM 1 that functions as a master is referred to as a master CM 1a, and a CM 1 that functions as a slave is referred to as a slave CM 1b.

The GUI/CLI control unit 111 of the master CM 1a issues a function enabling instruction to the command control unit 112 (refer to reference numeral C1).

The command control unit 112 of the master CM 1a receives the command instruction (refer to reference numeral C2) and responds to the GUI/CLI control unit ill with the function enabling instruction (refer to reference numeral C3).

The GUI/CLI control unit 111 of the master CM 1a requests a function enabling result to the command control unit 112 (refer to reference numeral C4).

The command control unit 112 of the master CM 1a issues a memory acquisition request to the memory management unit 113 (refer to reference numeral C5) and responds the function enabling result to the GUI/CLI control unit 111 (refer to reference numeral C6).

The memory management unit 113 of the master CM 1a executes the cache table acquisition processing in synchronization with the memory management unit 113 of the slave CM 1b (refer to reference numerals C7 and C8). Note that details of the cache table acquisition processing will be described later with reference to FIG. 9.

The memory management unit 113 of the master CM 1a responds to the command control unit 112 that the memory is acquired (refer to reference numeral C9).

The command control unit 112 of the master CM 1a issues a configuration change instruction to the configuration management unit 114 (refer to reference numeral C10).

The configuration management unit 114 of the master CM 1a executes device configuration change processing (refer to reference numeral C11) and responds to the command control unit 112 that the configuration is changed (refer to reference numeral C12).

The GUI/CLI control unit 111 of the master CM 1a requests the function enabling result to the command control unit 112 (refer to reference numeral C13).

The command control unit 112 of the master CM 1a terminates command processing (refer to reference numeral C14) and responds the function enabling result to the GUI/CLI control unit 111 (refer to reference numeral C15). Then, the function enabling processing is terminated.

Note that the GUI/CLI control unit 111 performs polling on the response to the function enabling result from the command control unit 112 after receiving the response of the function enabling instruction indicated by reference numeral C3 and until receiving the response of the function enabling result indicated by reference numeral C15 (refer to reference numeral C16).

Figure 9:
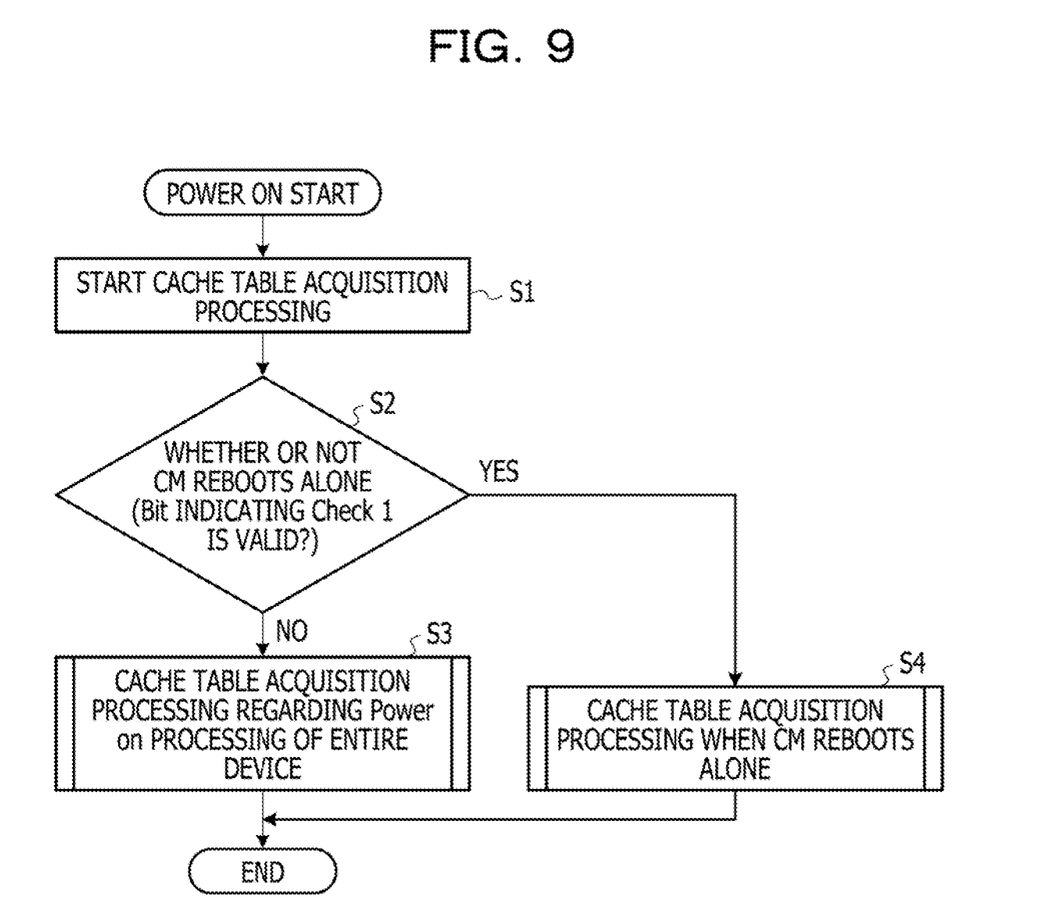
FIG. 9 is a flowchart for explaining details of cache table acquisition processing illustrated in FIG. 8.

Next, the details of the cache table acquisition processing illustrated in FIG. 8 will be described with reference to the flowchart (steps S1 to S4) illustrated in FIG. 9.

When detecting Power on of the CM 1, the memory management unit 113 starts the cache table acquisition processing (step S1).

The memory management unit 113 determines whether or not the Power on is the reboot of the CM 1 alone (in other words, whether or not Bit indicating Check 1 that is recovery processing of CM 1 is valid) (step S2).

In a case where the Power on is not the reboot of the CM 1 alone (refer to NO route in step S2), the memory management unit 113 executes the cache table acquisition processing regarding the Power on processing on the entire storage device 100 (step S3). Then, the cache table acquisition processing is terminated. Note that details of the cache table acquisition processing regarding the Power on processing on the entire storage device 108 indicated in step S3 will be described later with reference to FIG. 10.

On the other hand, in a case where Power on is the reboot of the CM 1 alone (refer to YES route in step S2), the memory management unit 113 executes the cache table acquisition processing when the CM 1 reboots alone (step S4). Then, the cache table acquisition processing is terminated. Note that details of the cache table acquisition processing when the CM 1 reboots alone indicated in step S4 will be described later with reference to FIG. 10.

Figure 10:
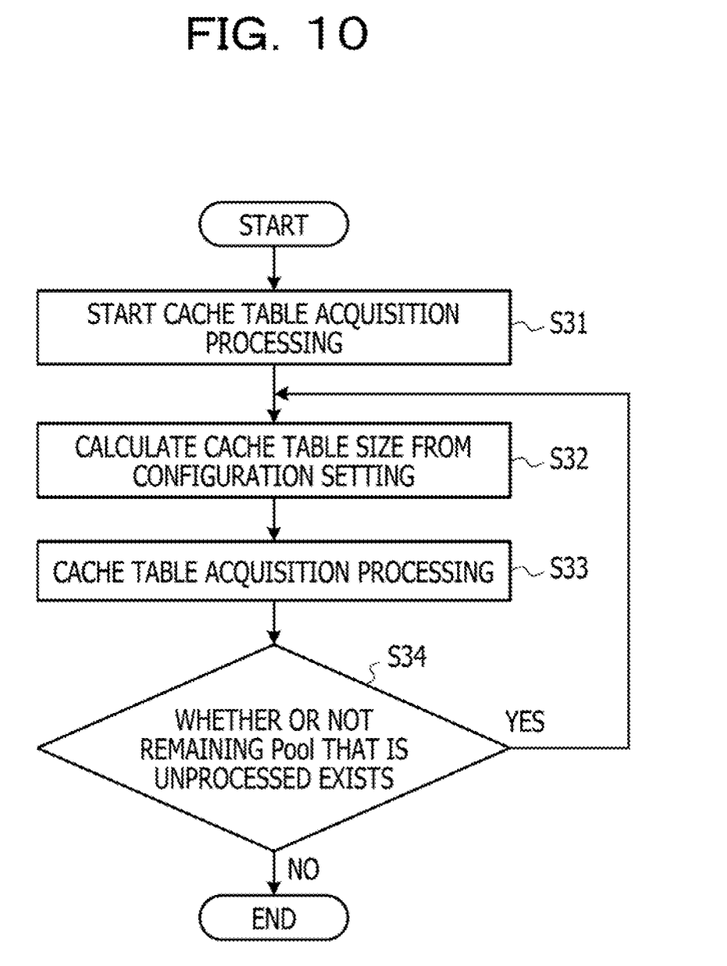
FIG. 10 is a flowchart for explaining details of cache table acquisition processing when Power on is performed on an entire device as illustrated in FIG. 9.

Next, the details of the cache table acquisition processing when the Power on is performed on the entire device illustrated in FIG. 9 will be described with reference to the flowchart (steps S31 to S34) illustrated in FIG. 10.

The memory management unit 113 starts the cache table acquisition processing when the Power on is performed on the entire storage device 100 (step S31).

The memory management unit 113 calculates a size of the cache table from configuration setting (step S32). The memory management unit 113 executes a function that determines a size of a cache table defined for each Pool ID.

The memory management unit 113 executes the cache table acquisition processing (step S33).

The memory management unit 113 determines whether or not a remaining Pool that is unprocessed exists (step S34).

In a case where the remaining Pool that is unprocessed exists (refer to YES route in step S34), the processing returns to step S32.

On the other hand, in a case where the remaining Pool that is unprocessed does not exist (refer to NO route in step S34), the cache table acquisition processing when the Power on is performed on the entire storage device 100 is terminated.

Figure 11:
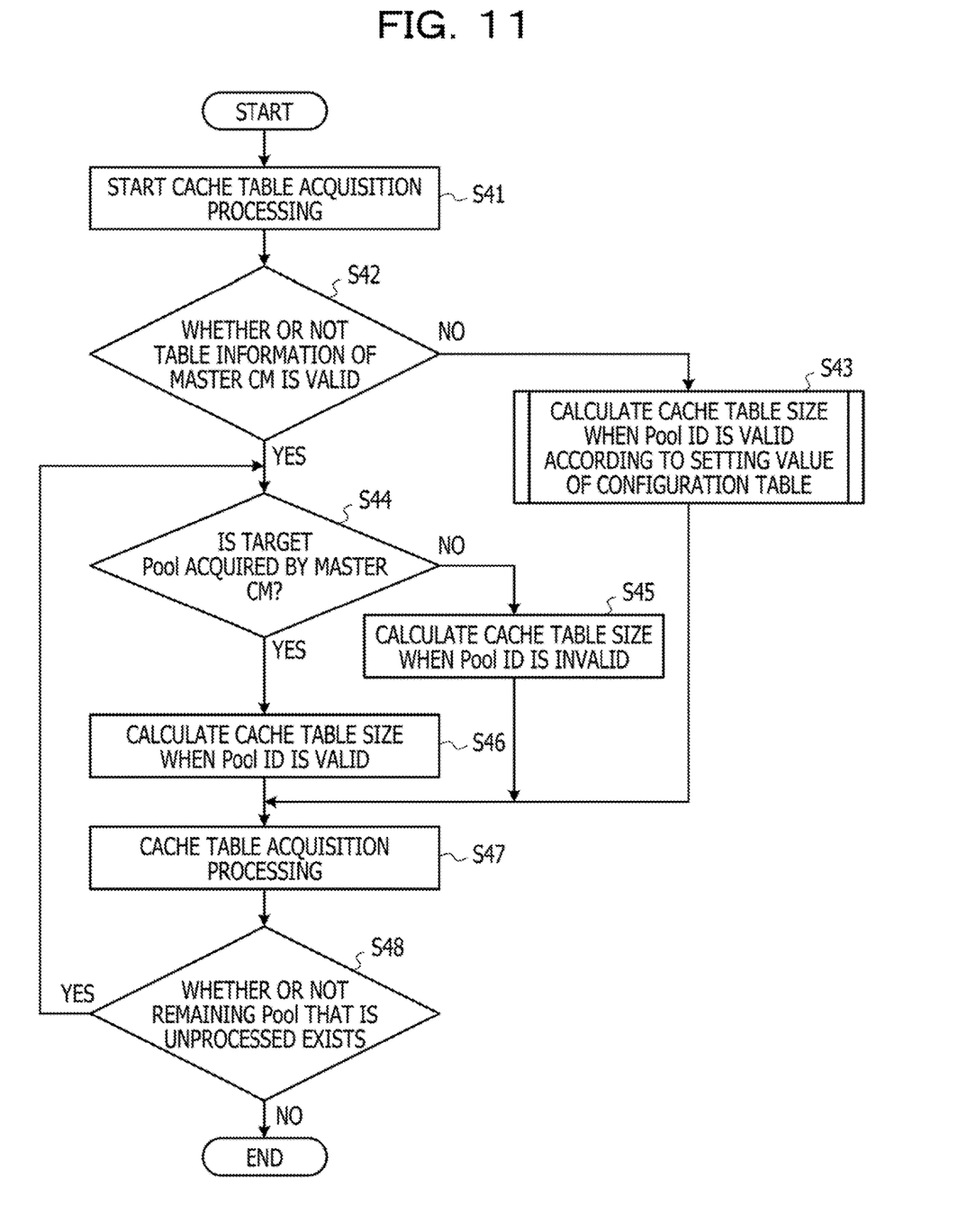
FIG. 11 is a flowchart for explaining details of cache table acquisition processing when a CM reboots alone as illustrated in FIG. 9.

Next, the details of the cache table acquisition processing when the CM 1 reboots alone illustrated in FIG. 9 will be described with reference to the flowchart (steps S41 to S48) illustrated in FIG. 11.

The memory management unit 113 starts the cache table acquisition processing when the CM 1 reboots alone (step S41).

The memory management unit 113 determines whether or not the cache table information of the master CM 1a is valid (step S42).

In a case where the cache table information of the master CM 1a is not valid (refer to NO route in step S42), the memory management unit 113 calculates the size of the cache table when a Pool ID is valid according to a setting value of a configuration table (step S43). For example, the entire storage device 100 is reactivated, and the cache table acquisition processing when the Power on is performed on the entire storage device 100 illustrated in FIG. 10 is executed. Then, the processing proceeds to step S47.

On the other hand, in a case where the cache table information of the master CM 1a is valid (refer to YES route in step S42), the memory management unit 113 determines whether or not the target Pool is acquired by the master CM 1a (step S44).

In a case where the target Pool is not acquired by the master CM 1a (refer to NO route in step S44), the memory management unit 113 calculates a size of the cache table when the Pool ID is invalid (step S45). In a case where the target Pool is not acquired by the master CM 1a, the size of the cache table is calculated as zero. Then, the processing proceeds to step S47.

On the other hand, in a case where the target Pool is acquired by the master CM 1a (refer to YES route in step S44), the memory management unit 113 calculates the size of the cache table when the Pool ID is valid (step S46).

The memory management unit 113 executes the cache table acquisition processing (step S47).

The memory management unit 113 determines whether or not the remaining Pool that is unprocessed exists (step S48).

In a case where the remaining Pool that is unprocessed exists (refer to YES route in step S48), the processing returns to step S44.

On the other hand, in a case where the remaining Pool that is unprocessed does not exist (refer to NO route in step S48), the cache table acquisition processing when the CM 1 reboots alone is terminated.

[A-3] Effect

According to the CM 1 and the control program in the example of the embodiment described above, for example, the following effects can be obtained.

The memory management unit 113 determines whether the activation of the CM 1 is caused by the activation of the entire storage device 100 or the activation of the CM 1 alone. Then, the memory management unit 113 acquires the table region where the cache table for enabling the functions of the storage device 100 is stored according to the determination result.

As a result, the cache table acquisition states of the plurality of CMs 1 included in the storage device 100 can be matched. Specifically, even in a case where the function enabling processing is abnormally terminated during the execution of the cache table acquisition processing when the function of the storage device 100 is enabled, the cache table acquisition states of the CM 1 in which an abnormally occurs and the other CM 1 can be matched when the CM 1 in which an abnormally occurs is rebooted. Then, by making the cache table acquisition states of the CMs 1 have consistency, the storage device 100 can be stably operated.

In a case where the activation of the CM 1 that functions as a slave is caused by the activation of the CM 1 alone, the memory management unit 113 acquires an acquisition state of a region from the CM 1 that functions as a master and acquires a table region on the basis of the acquired acquisition state.

With this operation, the cache table acquisition states of the slave CM 1 and the master CM 1 can be matched.

The memory management unit 113 acquires a table region for a Pool of which an ID is included in the acquisition state according to a size of the region allocated in the acquisition state.

With this operation, the region sizes of the cache tables of the slave CM 1 and the master CM 1 can be matched.

The memory management unit 113 acquires a table region for a Pool of which the ID is not included in the acquisition state as setting a size of the region to be zero.

With this operation, while it is assumed that a region size of a Pool that is not acquired by the master CM 1 be zero, the slave CM 1 can acquire the table region.

In a case where it is not possible to acquire the acquisition state, the memory management unit 113 acquires the table region after reactivating the entire storage device 100.

With this operation, even in a case where it is not possible to acquire the cache table acquisition state from the master CM 1, the consistency of the cache table acquisition states of the CMs 1 can be ensured.

[B] Others

The disclosed technology is not limited to the embodiment described above and can be variously modified without departing from the spirit of the present embodiment. Each configuration and each processing of the present embodiment can be selected as needed or can be appropriately combined.

The device configuration of the storage device 100 is not limited to the example illustrated in FIG. 4.

Figure 12:
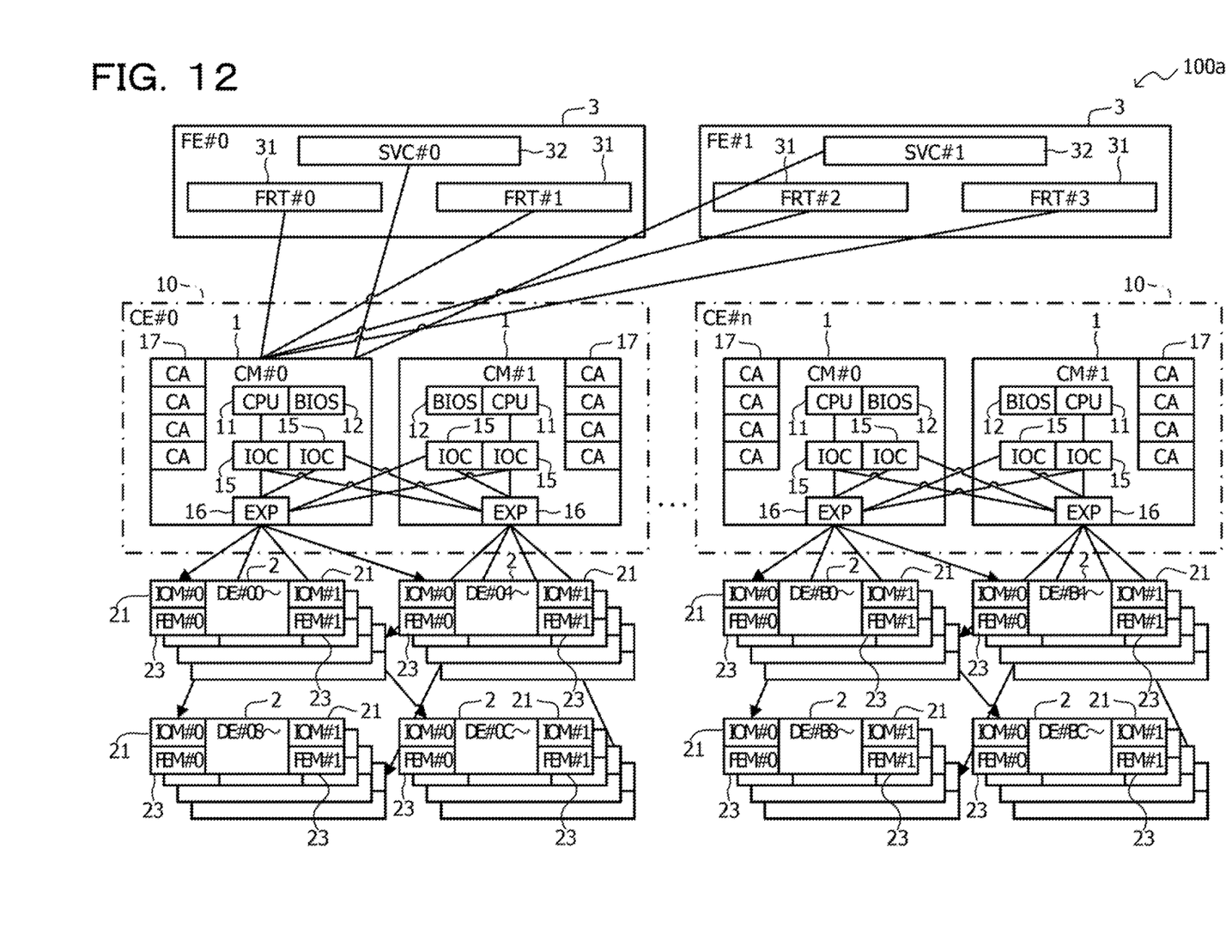
FIG. 12 is a block diagram schematically illustrating an exemplary hardware configuration of a high-end storage device.

FIG. 12 is a block diagram schematically illustrating an exemplary hardware configuration of a high-end storage device 100*a*.

The storage device 100*a* includes n-1 CE 10 (in other words, CEs #0 to #n), and each CE 10 is connected to four DEs 2. Note that the configurations of the CE 10 and the DE 2 are similar to those of the storage device 100 illustrated in FIG. 4.

Furthermore, the storage device 100*a* includes two FEs 3 (in other words, FEs #0 and #1).

Each FE 3 includes two Frontend Routers (FRT) 31 and a Service Controller (SVC) 32. Note that the FE #0 includes FRTs #0 and #1 and a SVC #0, and the FE #0 includes FRTs #2 and #3 and a SVC #1.

The FRT 31 provides a communication path between the FE 3 and the CM 1.

The SVC 32 is a unit that manages a system and monitors and controls a module mounted on the storage device 100*a*.

The storage device 100*a* illustrated in FIG. 12 can also obtain workings and effects similar to those of the storage device 100 indicated in the example of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control device operable as one of a plurality of storage control devices included in a storage system, the storage control device comprising:
    a memory; and
    a processor coupled to the memory, the processor being configured to processing, the processing including:
    obtaining, in response to detecting of an activation of the storage control device, a determination result by determining whether activation of the storage control device is caused by an instruction to activate the entire storage system or an instruction to activate the storage control device alone; and
    in response to the determination result indicating that the detected activation of the storage control device is caused by the instruction to activate the storage control device alone, setting a control information storage region in the storage control device based on an acquisition state of the control information storage region in other storage control device of the plurality of storage control devices, the control information storage region of the storage control device being a memory region configured to store control information used to enable a function of the storage system,
    the storage control device is configured to be as a slave in the storage device,
    the setting of the control information storage region is configured to:
    in response to the determination result indicating that the detected activation of the storage control device is caused by the instruction to activate the storage control device alone, acquire an acquisition state of the control information storage region from other storage control device, which is operated as a master, among the plurality of storage control devices; and
    set the control information storage region on the basis of the acquired acquisition state.

2. The storage control device according to claim 1, wherein the setting of the control information storage region is configured to set the control information storage region according to a size of an allocated region in the acquisition state for a storage pool of which an identifier is included in the acquisition state.

3. The storage control device according to claim 1, wherein the setting of the control information storage region is configured to set the control information storage region for the storage pool of which the identifier is not included in the acquisition state as setting a size of the region to be zero.

4. The storage control device according to claim 1, wherein the setting of the control information storage region is configured to: when it is not possible to acquire the acquisition state during a predetermined time period, set the control information storage region after reactivating the entire storage system.

5. The storage control device according to claim 1, wherein the instruction to activate the entire storage system is an instruction to perform power-on processing on the entire storage system.

6. The storage control device according to claim 1, wherein the instruction to activate the storage control device alone is an instruction to perform re-boot processing on the storage control device alone.

7. A non-transitory computer-readable storage medium for storing a program which causes a processor included in a storage control device to execute processing, the storage control device being configured to be operated as one of a plurality of storage control devices included in a storage system, the processing comprising:
　　obtaining, in response to detecting of an activation of the storage control device, a determination result by determining whether activation of the storage control device is caused by an instruction to activate the entire storage system or an instruction to activate the storage control device alone; and
in response to the determination result indicating that the detected activation of the storage control device is caused by the instruction to activate the storage control device alone, setting a control information storage region in the storage control device based on an acquisition state of the control information storage region in other storage control device of the plurality of storage control devices, the control information storage region of the storage control device being a memory region configured to store control information used to enable a function of the storage system,
the storage control device is configured to be as a slave in the storage device,
the setting of the control information storage region is configured to:
in response to the determination result indicating that the detected activation of the storage control device is caused by the instruction to activate the storage control device alone, acquire an acquisition state of the control information storage region from other storage control device, which is operated as a master, among the plurality of storage control devices; and
set the control information storage region on the basis of the acquired acquisition state.

\* \* \* \* \*